US012240737B2

(12) United States Patent
Motoyama et al.

(10) Patent No.: US 12,240,737 B2
(45) Date of Patent: Mar. 4, 2025

(54) WORK MACHINE SWIVELING FRAME AND ASSEMBLY METHOD FOR WORK MACHINE SWIVELING FRAME

(71) Applicant: KOBELCO CONSTRUCTION MACHINERY CO., LTD., Hiroshima (JP)

(72) Inventors: Yuudai Motoyama, Hyogo (JP); Akira Koyahata, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 260 days.

(21) Appl. No.: 17/906,231

(22) PCT Filed: Mar. 4, 2021

(86) PCT No.: PCT/JP2021/008458
§ 371 (c)(1),
(2) Date: Sep. 13, 2022

(87) PCT Pub. No.: WO2021/199892
PCT Pub. Date: Oct. 7, 2021

(65) Prior Publication Data
US 2023/0117144 A1 Apr. 20, 2023

(30) Foreign Application Priority Data
Apr. 3, 2020 (JP) ................................ 2020-067216

(51) Int. Cl.
*B66C 23/36* (2006.01)

(52) U.S. Cl.
CPC .... *B66C 23/365* (2013.01); *B66C 2700/0371* (2013.01)

(58) Field of Classification Search
CPC .......... B66C 23/365; B66C 2700/0371; B66C 23/74
See application file for complete search history.

(56) References Cited

U.S. PATENT DOCUMENTS 4,196,816 A 4/1980 Dvorsky et al.
6,848,522 B2 * 2/2005 Moore ................ B62D 55/084 180/9.1

(Continued)

FOREIGN PATENT DOCUMENTS

EP 3 112 310 A1 1/2017
JP 57-181789 U 11/1982

(Continued)

OTHER PUBLICATIONS

Extended European Search Report issued on Jul. 26, 2023 in European Patent Application No. 21781952.3, 6 pages.

(Continued)

*Primary Examiner* — Sang K Kim
*Assistant Examiner* — Nathaniel L Adams
(74) *Attorney, Agent, or Firm* — Oblon, McClelland, Maier & Neustadt, L.L.P.

(57) ABSTRACT

A slewing frame of a work machine and a method of assembling a slewing frame of a work machine where the slewing frame is separable into at least two front and rear members, and an operation of connecting these two members can be easily performed. A slewing frame is separable into a front frame and a rear frame. When a pin fitting portion of a rear frame is fitted on a positioning pin of a front frame, and the rear frame is rotated downward, at a position where a front pin hole and a rear pin hole are aligned with each other, a contact portion of the rear connecting portion is brought into contact with a rotation preventing portion. As (Continued)

a result, a connecting pin can be easily inserted into the front pin hole and the rear pin hole.

6 Claims, 10 Drawing Sheets

(56) References Cited

U.S. PATENT DOCUMENTS

| | | | | |
|---|---|---|---|---|
| 6,871,427 | B2 * | 3/2005 | Muta | B66C 23/74<br>212/196 |
| 2010/0213155 | A1 * | 8/2010 | Hanahara | B66C 23/365<br>212/294 |
| 2018/0281877 | A1 * | 10/2018 | Piccinini | B66C 23/365 |

FOREIGN PATENT DOCUMENTS

| | | | | |
|---|---|---|---|---|
| JP | 2002255480 | A | * | 9/2002 |
| JP | 2010-195542 | A | | 9/2010 |
| JP | 2014-43319 | A | | 3/2014 |
| JP | 2018-76130 | A | | 5/2018 |
| JP | 2018076130 | A | * | 5/2018 |

OTHER PUBLICATIONS

International Search Report Issued Apr. 13, 2021, in PCT/JP2021/008458, filed on Mar. 4, 2021, 3 pages.

* cited by examiner

WORK MACHINE SWIVELING FRAME AND ASSEMBLY METHOD FOR WORK MACHINE SWIVELING FRAME

TECHNICAL FIELD

The present invention relates to a slewing frame of a work machine and a method of assembling a slewing frame of a work machine.

BACKGROUND ART

Conventionally, as a work machine, there has been known a mobile crane that includes a lower travelling body, an upper slewing body, and a raisable/lowerable member such as a boom. The upper slewing body is supported by the lower travelling body so as to be turnable about a turning center axis extending in the vertical direction. The raisable/lowerable member is mounted on a front portion of the upper slewing body in a raisable/lowerable manner. Each member of such a mobile crane is a heavy object. Accordingly, each member is disassembled when necessary, and disassembled parts are respectively transported by transport vehicles.

Patent Literature 1 discloses a technique where an upper slewing body of a mobile crane can be separated into a front part and a rear part. In this technique, the upper slewing body includes a front-side block and a rear-side block. A positioning pin extending in the left-right direction protrudes from a front end portion of the rear-side block, and a groove portion capable of receiving the positioning pin is formed on a rear end portion of the front-side block. When the rear-side block is lifted by an auxiliary crane and the positioning pin is inserted into the groove portion, an upper portion of a front end portion of the rear-side block is supported by an upper portion of a rear end portion of the front-side block. On the other hand, pin holes are formed in a lower portion of the front end portion of the rear-side block, and pin holes are formed in a lower portion of the rear end portion of the front-side block. The front-side block and the rear-side block are connected to each other by inserting a connecting pin into the respective pin holes.

According to such a technique, the rear-side block and the front-side block can be individually transported in a state where the rear-side block is removed from the front-side block. On the other hand, the front-side block of the upper slewing body and the lower travelling body can be transported in a state where the front-side block of the upper slewing body and the lower travelling body are connected to each other. Accordingly, it is not necessary to disassemble a periphery of a slewing bearing that connects the upper slewing body and the lower travelling body in a turnable manner and hence, man-hours necessary for a transportation work of the mobile crane is reduced.

CITATION LIST

Patent Literature

Patent Literature 1: JP 2010-195542 A

In the technique described in Patent Literature 1, when an upper portion of a front end portion of the rear-side block is supported by an upper portion of a rear end portion of the front-side block, a pin hole formed in the rear-side block and a pin hole formed in the front-side block are not aligned with each other. Accordingly, it is necessary to insert a connecting pin into respective pin holes while strongly pushing tapered portions formed on a distal end of the connecting pin into respective pin holes in order and rotating the rear-side block around a positioning pin. Therefore, there exists a problem that a connecting work for connecting the front-side block and the rear-side block to each other requires a large amount of labor and time.

SUMMARY OF INVENTION

The present invention has been made in view of the above problems, and it is an object of the present invention to provide a slewing frame of a work machine and a method of assembling a slewing frame of a work machine where the slewing frame is separable into at least two front and rear members, and an operation of connecting these two members can be easily performed.

The slewing frame of the work machine provided by the present invention is supported by a lower body of the work machine so as to be turnable about a turning center axis that extends in a vertical direction. The slewing frame includes a front frame that forms a front side portion of the slewing frame and is turnably supported by the lower body, and a rear frame that forms a rear side portion of the slewing frame and is detachably connected to the front frame. The front frame has a pair of left and right front connecting portions each of which includes a positioning pin that extends in a left-right direction, the pair of left and right front connecting portions being disposed on a rear end portion of the front frame spaced apart from each other in the left-right direction. In the pair of left and right front connecting portions, a front side pin hole that allows a connecting pin that connects the front frame and the rear frame to each other to pass therethrough is formed in the left-right direction below the positioning pin respectively, a distance between the front side pin hole and the positioning pin being set to a predetermined reference distance as viewed in the left-right direction, the rear frame has a pair of left and right rear connecting portions that are disposed spaced apart from each other in the left-right direction on a front end portion of the rear frame such that the pair of left and right rear connecting portions face the pair of left and right front connecting portions in the left-right direction, the pair of left and right rear connecting portions each include an inner peripheral surface that defines an opening portion that allows the positioning pin to pass through the opening portion in a vertical direction, and a pin fitting portion that communicates with the opening portion above the opening portion and is configured to fit on an outer peripheral surface of the positioning pin such that rear frame is rotatable about the positioning pin, a rear side pin hole that allows insertion of the connecting pin is formed along the left-right direction in a portion of each of the pair of left and right rear connecting portions below the pin fitting portion, a distance between the pin fitting portion and the rear side pin hole is set to the reference distance as viewed in the left-right direction, the pair of left and right front connecting portions of the front frame each have a rotation preventing portion capable of preventing rotation of the rear frame in a downward direction about the positioning pin, and the pair of left and right rear connecting portions of the rear frame each have a contact portion that is disposed on a plane that is orthogonal to the left-right direction and passes the rotation preventing portion, the contact portion being configured to be brought into contact with the rotation preventing portion such that further rotation of the rear frame is prevented at a position where the front side pin hole and the rear side pin hole are aligned with each other in the left-right direction along with the rotation of the rear frame.

DESCRIPTION OF EMBODIMENTS

Figure 1:
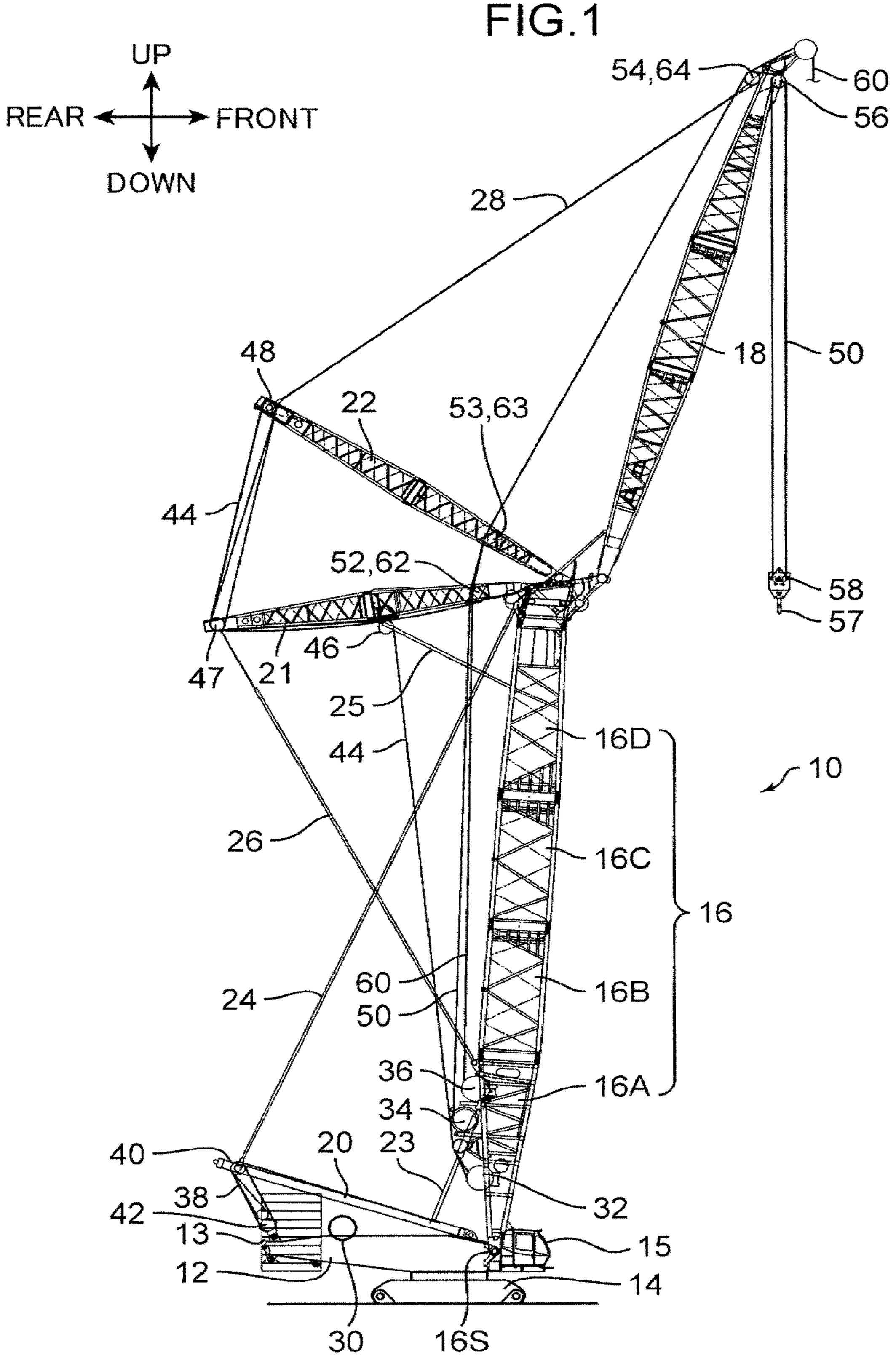
FIG. 1 is a side view illustrating a work machine according to one embodiment of the present invention.

Hereinafter, one embodiment of the present invention is described with reference to the drawings. FIG. 1 is a side view illustrating a crane 10 (a work machine) according to one embodiment of the present invention. Hereinafter, in respective drawings, the directions of "upper", "lower", "left", "right", "front", and "rear" are indicated. However, the directions are indicated for convenience's sake to describe the structure and an assembling method of the crane 10 according to the present embodiment, and these directions do not limit the moving directions, a use mode, and the like of the work machine according to the present invention.

The crane 10 includes: an upper slewing body 12 that corresponds to a crane body; a lower travelling body 14 that supports the upper slewing body 12 in a turnable manner; a raisable/lowerable member that includes a boom 16 and a jib 18; and a mast 20 which is a boom raisable/lowerable member. A counterweight 13 for adjusting the balance of the crane 10 is mounted on a rear portion of the upper slewing body 12. A cab 15 is mounted on a front end portion of the upper slewing body 12. The cab 15 corresponds to a driver's seat in the crane 10.

The boom 16 illustrated in FIG. 1 is a so-called lattice type boom. The boom 16 includes a proximal end side member 16A, one or a plurality of (two in FIG. 1) intermediate members 16B and 16C, and a distal end side member 16D. A rear strut 21 and a front strut 22 that rotate the jib 18 as described later are rotatably connected to a distal end portion of a distal end side member 16D. The boom 16 is pivotally supported by the upper slewing body 12 so as to be rotatable about a boom foot pin 16S mounted on a lower end of the boom 16 as a fulcrum.

However, in the present invention, the boom is not limited to the specific structure. For example, the boom may have no intermediate member, or the number of intermediate members may be different from the number described above. Further, the boom may be formed of a single member.

Although the jib 18 is also not limited to the specific structure, the jib 18 has a lattice structure in the illustrated example. A proximal end portion of the jib 18 is rotatably connected to (pivotally supported on) a distal end portion of the distal end side member 16D of the boom 16, and a rotation center axis of the jib 18 is a horizontal axis parallel to a rotation center axis (boom foot pin 16S) of the boom 16 with respect to the upper slewing body 12.

The mast 20 has a proximal end and a pivot end, and the proximal end of the mast 20 is rotatably connected to the upper slewing body 12. The rotation axis of the mast 20 is parallel to the rotation axis of the boom 16 and is positioned immediately behind the rotation axis of the boom 16. That is, the mast 20 is rotatable in the same direction as the raising and lowering direction of the boom 16. On the other hand, a rotary end of the mast 20 is connected to the distal end of the boom 16 by way of a pair of left and right boom guylines 24. This connection links the rotation of the mast 20 and the rotation of the boom 16.

A pair of left and right back stops 23 is provided to a proximal end side member 16A of the boom 16. These backstops 23 are brought into contact with both left and right sides of the upper slewing body 12 at a point of time that the boom 16 reaches the raised posture illustrated in FIG. 1. This contact prevents the boom 16 from being tilted backward due to strong wind or the like.

The rear strut 21 and the front strut 22 are rotatably and pivotally supported on the distal end of the boom 16. The rear strut 21 is held in a posture where the rear strut 21 extends from the distal end of the distal end side member 16D toward the boom raised side (the rear side in FIG. 1). As a means for holding this posture, a pair of left and right backstops 25 and a pair of left and right guy links 26 are interposed between the rear strut 21 and the boom 16. The backstops 25 are interposed between the distal end side member 16D and the intermediate portion of the rear strut 21, and support the rear strut 21 from below. The guy links 26 are stretched between the distal end portion of the rear strut 21 and the proximal end side member 16A of the boom 16 so as to connect the distal end portion of the rear strut 21 and the proximal end side member 16A of the boom 16 to each other. The position of the rear strut 21 is regulated by a tension generated by stretching of the guy links 26. In another embodiment, the rear strut 21 and the front strut 22 may be rotatably and pivotally supported by a proximal end portion of the jib 18. Further, the rear strut 21 may be rotatably and pivotally supported by the distal end portion of the boom 16, and the front strut 22 may be rotatably and pivotally supported by the proximal end portion of the jib 18.

The front strut 22 is connected to the jib 18 such that the front strut 22 is rotatable with the jib 18 in an interlocking manner (integrally). To be more specific, the pair of right and left jib guy lines 28 is stretched between a distal end portion of the front strut 22 and a distal end portion of the jib 18 so as to connect the distal end portion of the front strut 22 and the distal end portion of the jib 18. With such a configuration, the jib 18 is also rotationally driven as the front strut 22 is rotationally driven. As illustrated in FIG. 1, the rear strut 21 described above is disposed behind the front strut 22, and a substantially isosceles triangle shape is formed between the rear strut 21 and the front strut 22.

Various winches are mounted on the crane 10. Specifically, a boom raising and lowering winch 30 for raising and lowering the boom 16, a jib winch 32 for rotating the jib 18 in the raising and lowering direction, and a main winding winch 34 and an auxiliary winding winch 36 for winding up and down a lifting load are mounted. In the crane 10 according to the present embodiment, the winch 30 for raising and lowering the boom 16 is mounted on the upper slewing body 12. Further, the jib raising and lowering winch 32, the main winding winch 34, and the auxiliary winding winch 36 are all mounted on the proximal end side member 16A of the boom 16. These winches 32, 34, and 36 may be mounted on the upper slewing body 12.

The boom raising and lowering winch 30 winds up and winds out the boom raising and lowering rope 38. Then, the boom raising and lowering rope 38 is wired such that the mast 20 is rotated by winding or the unwinding the boom raising and lowering rope 38. Specifically, sheave blocks 40 and 42 in each of which a plurality of sheaves are arranged in the width direction are mounted on the rotating end of the mast 20 and the rear end portion of the upper slewing body 12, respectively. The boom raising and lowering rope 38 that is pulled out from the boom raising and lowering winch 30 is extended between the sheave blocks 40 and 42. With such a configuration, when the boom raising and lowering winch 30 winds up and winds out the boom raising and lowering rope 38, a distance between both sheave blocks 40 and 42 changes and hence, the mast 20 and the boom 16 that is operable in an interlocking manner with the mast 20 rotate in the raising and lowering direction.

The jib raising and lowering winch 32 winds up and winds out a jib raising and lowering rope 44 that is extended between and wound around the rear strut 21 and the front strut 22. The jib raising and lowering rope 44 is wired such that the front strut 22 is rotated by winding up and winding out of the jib raising and lowering rope 44. Specifically, a guide sheave 46 is disposed on an intermediate portion of the rear strut 21 in a longitudinal direction of the rear strut 21. Sheave blocks 47, 48 each of which is formed of a plurality of sheaves are mounted on the rotary end of the rear strut 21 and the rotary end of the front strut 22. Then, the jib raising and lowering rope 44 pulled out from the jib raising and lowering winch 32 is wound around the guide sheave 46 and is extended between the sheave blocks 47 and 48. With such a configuration, when the jib raising and lowering winch 32 winds up and winds out the jib raising and lowering rope 44, a distance between both sheave blocks 47, 48 changes. Accordingly, the front strut 22 and the jib 18 that is operable in an interlocking manner with the front strut 22 rotate in the raising and lowering direction.

The main winding winch 34 winds up and winds down a suspended load using a main winding rope 50 (winding rope). With respect to the main winding, main winding guide sheaves 52, 53, and 54 are rotatably mounted on a proximal end vicinity portion of the rear strut 21, a proximal end vicinity portion of the front strut 22, and a distal end portion of the jib 18, respectively. Further, a main winding sheave block in which a plurality of main winding point sheaves 56 are arranged in the width direction is disposed at a position adjacent to the main winding guide sheave 54. The main winding rope 50 that is pulled out from the main winding winch 34 is wound around the main winding guide sheaves 52, 53, and 54 in this order, and is extended between the main winding point sheave 56 of the sheave block and a sheave 58 of a sheave block that is mounted on a main hook 57 (hook) for suspending a load. With such a configuration, when the main winding winch 34 (winding winch) winds up or winds out the main winding rope 50, the distance between both sheaves, that is, the sheaves 56 and 58 changes and hence, the main hook 57 connected to the main winding rope 50 that is suspended from the distal end of the jib 18 is wound up and down.

In the same manner, the auxiliary winding winch 36 winds up and winds down the suspended load using an auxiliary winding rope 60 (winding rope). With respect to the auxiliary winding, auxiliary winding guide sheaves 62, 63, and 64 are rotatably mounted coaxially with the main winding guide sheaves 52, 53, and 54, respectively. An auxiliary winding point sheave (not illustrated) is rotatably is disposed at a position adjacent to the auxiliary winding guide sheave 64. The auxiliary winding rope 60 pulled out from the auxiliary winding winch 36 is wound around the auxiliary winding guide sheaves 62, 63, and 64 in this order and is suspended from the auxiliary winding point sheave. Accordingly, when the auxiliary winding winch 36 winds up or winds out the auxiliary winding rope 60, an auxiliary hook for suspending a load (not illustrated) connected to a distal end of the auxiliary winding rope 60 is wound up or wound down.

Figure 2:
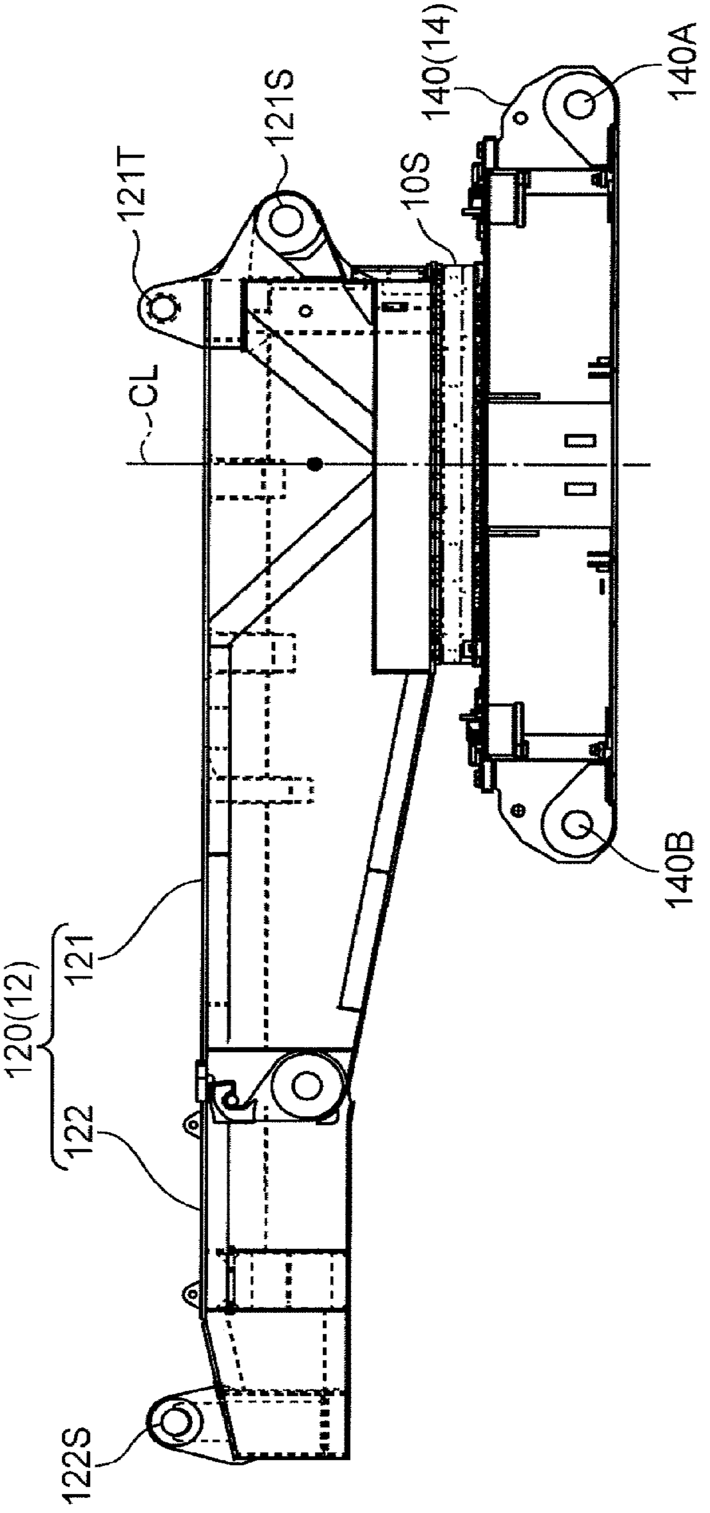
FIG. 2 is a side view of a lower frame and a slewing frame of the work machine according to one embodiment of the present invention.
Figure 2:
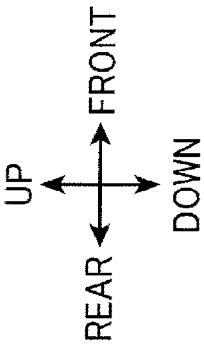
Figure 3:
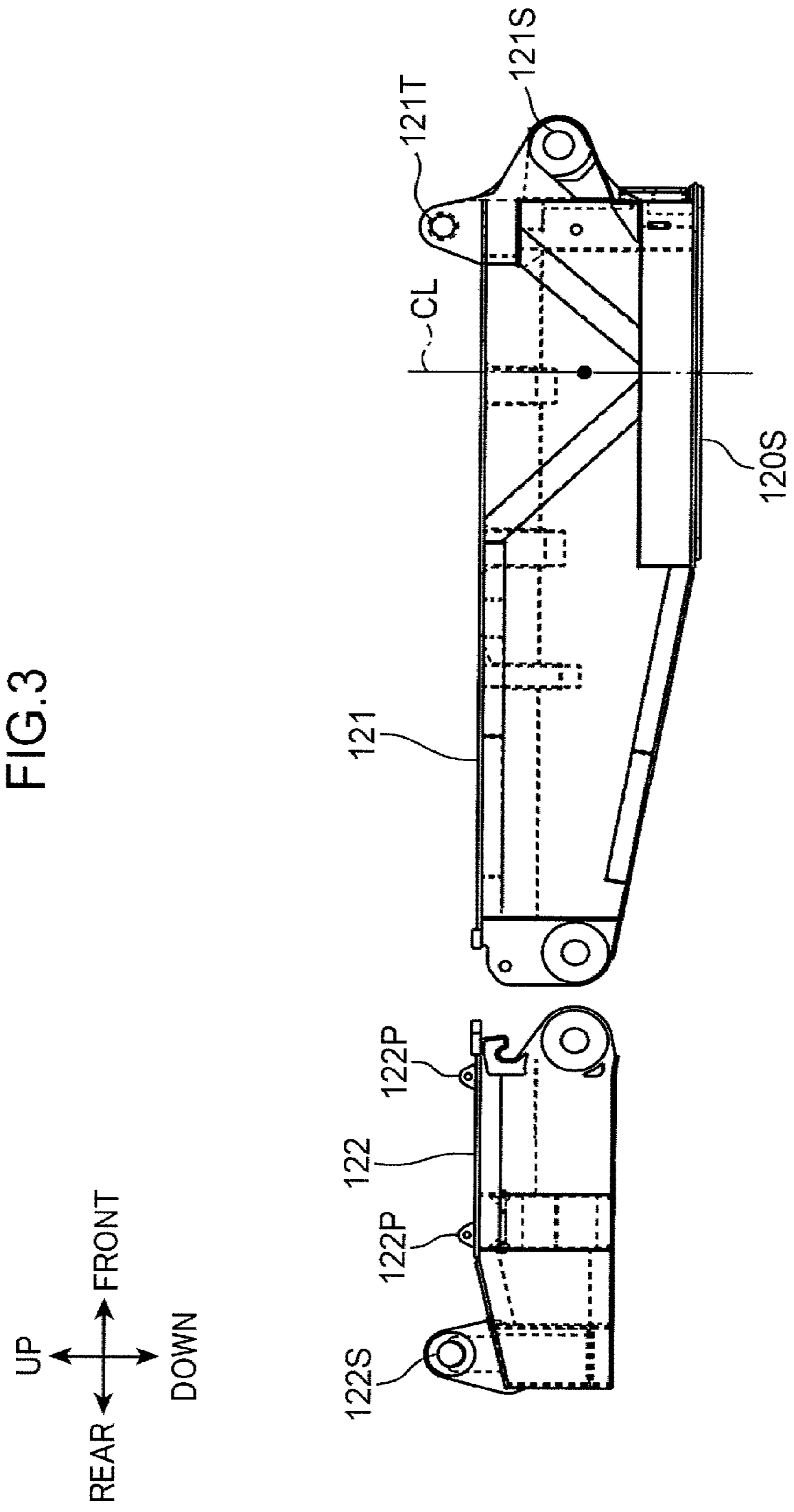
FIG. 3 is an exploded side view illustrating the slewing frame of the work machine according to one embodiment of the present invention.
Figure 4:
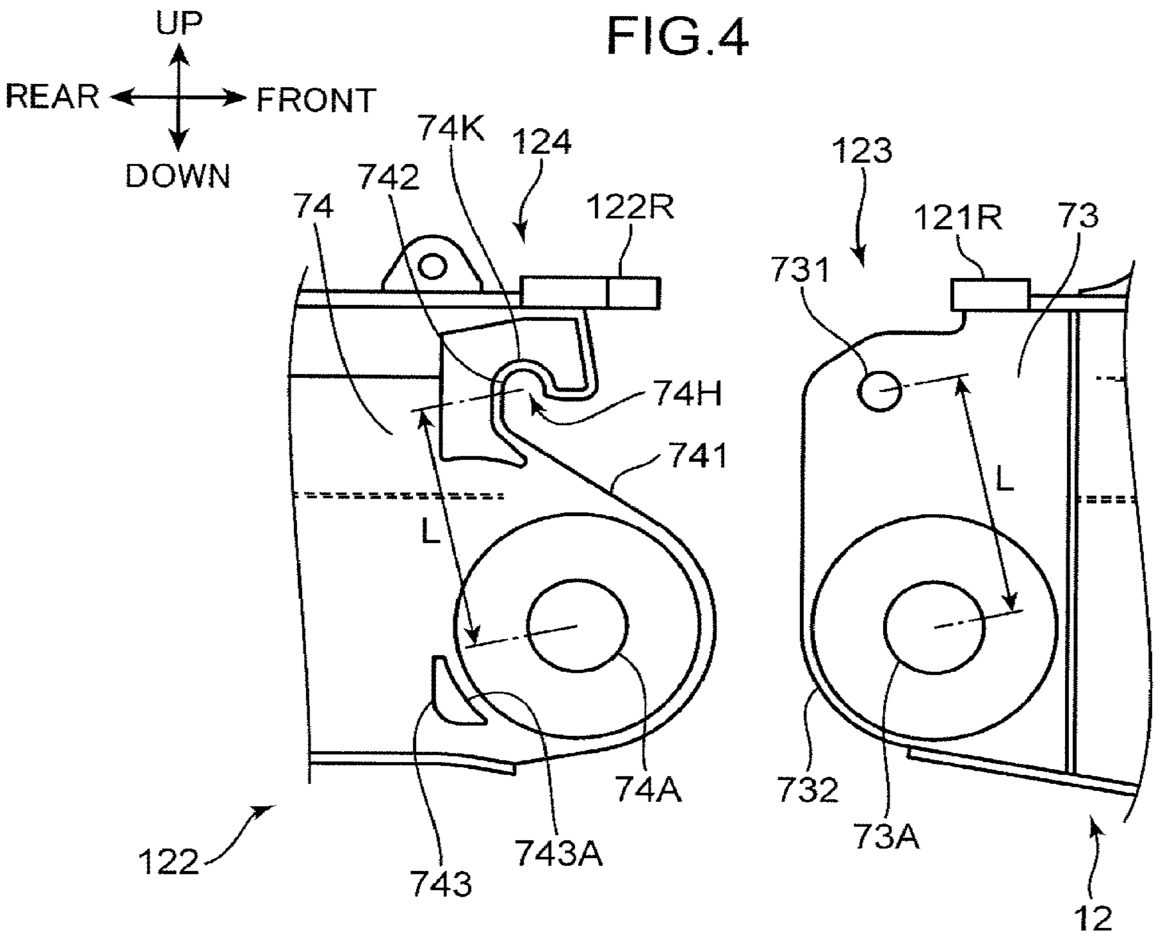
FIG. 4 is an enlarged exploded side view of a part of the slewing frame illustrated in FIG. 3.
Figure 5:
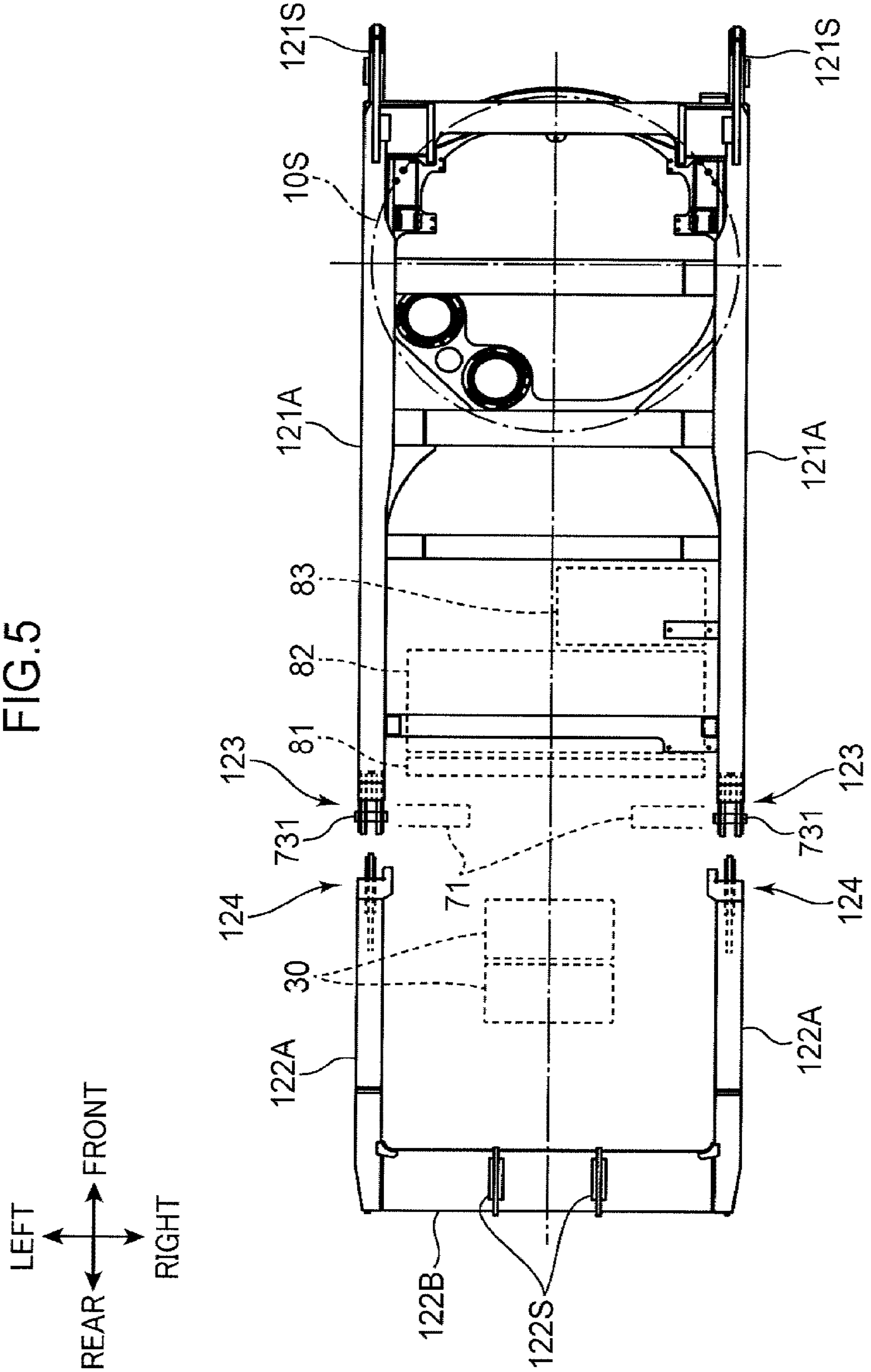
FIG. 5 is an exploded plan view of the slewing frame of the work machine according to one embodiment of the present invention.
Figure 6:
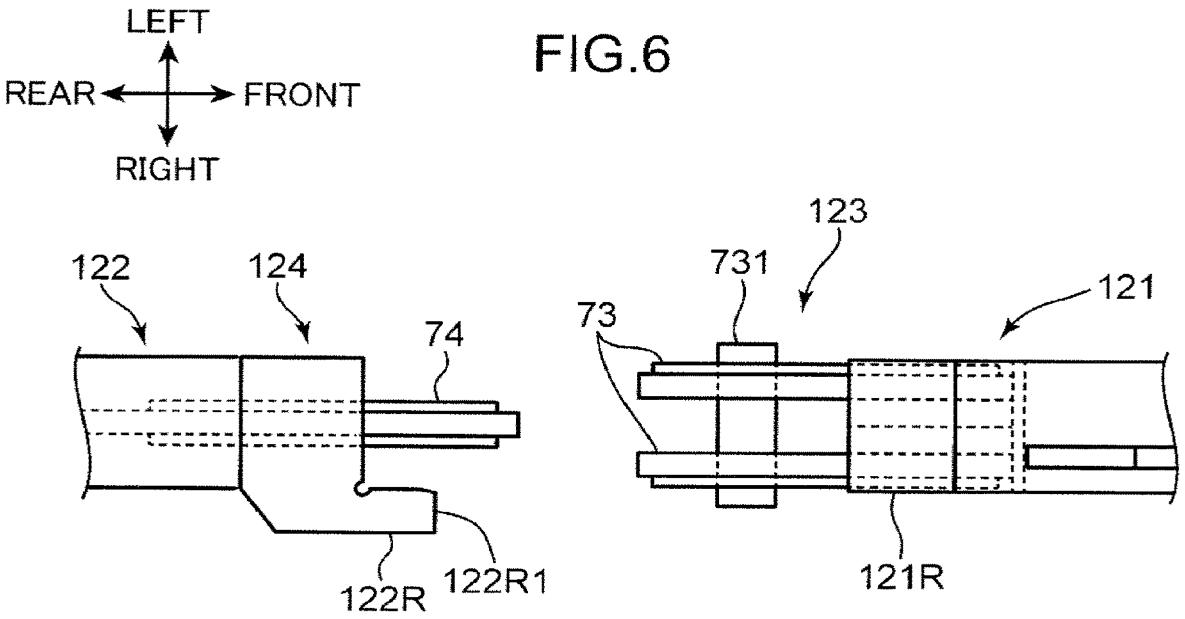
FIG. 6 is an exploded plan view of the slewing frame illustrated in FIG. 5 where a part of the slewing frame is illustrated in an enlarged manner.

FIG. 2 is a side view of the lower frame 140 and the slewing frame 120 of the crane 10 according to the present embodiment. FIG. 3 is an exploded side view of the slewing frame 120 of the crane 10 according to the present embodiment, and FIG. 4 is an exploded side view of a part of the slewing frame 120 illustrated in FIG. 3 in an enlarged manner. FIG. 5 is an exploded plan view of the slewing frame 120 of the crane 10 according to the present embodiment, and FIG. 6 is an exploded plan view of a part of the slewing frame 120 illustrated in FIG. 5 in an enlarged manner. In the following description, vertical, horizontal, and longitudinal directions are indicated with reference to the upper slewing body 12 (slewing frame 120).

The lower travelling body 14 has a lower frame 140. The lower frame 140 is a frame body that supports respective members of the lower travelling body 14. The lower frame 140 turnably supports the slewing frame 120 (described later) of the upper slewing body 12 about a turning center axis CL that extends in the vertical direction. More specifically, the lower frame 140 includes: a car body (not illustrated) that supports the upper slewing body 12 in a turnable manner, and a pair of left and right crawler bodies attached to both left and right side surfaces of the car body respectively. Crawlers are supported on the crawler bodies so as to be able to turn around. FIG. 3 illustrates: a front crawler shaft 140A that is a rotary shaft of a front roller that rotatably supports the crawler on a front side of the crawler body; and a rear crawler shaft 140B that is a rotary shaft of a rear roller that rotatably supports the crawler on a rear side of the crawler body.

The upper slewing body 12 has the slewing frame 120. The slewing frame 120 is a frame body that supports respective members of the upper slewing body 12. The slewing frame 120 is supported by the lower frame 140 of the lower travelling body 14 by way of a slewing bearing 10S so as to be turnable about the turning center axis CL extending in the vertical direction. The slewing frame 120 includes a front frame 121 and a rear frame 122. That is, the slewing frame 120 is dividable into two front and rear members.

The crane 10 further includes a slewing bearing 10S. The slewing bearing 10S connects the front frame 121 and the car body of the lower frame 140 such that the front frame 121 is turnable about the turning center axis CL.

The front frame 121 forms a front side portion of the slewing frame 120 of the upper slewing body 12, and is supported by the lower travelling body 14 by way of the slewing bearing 10S. Particularly, a fixing surface 120S (FIG. 3) of the front frame 121 is disposed on the slewing bearing 10S. The front frame 121 includes: a pair of both left and right front plates 121A (FIG. 5) defining both left and right side surfaces of the front frame 121; a bottom plate (not illustrated) that connects lower portions of the pair of left and right front plates 121A in the left-right direction; and a plurality of lateral connecting members (not illustrated) that connect upper portions of the pair of left and right front plates 121A in the left-right direction.

Each of the pair of left and right front plates 121A has a predetermined height in the vertical direction, and extends in an elongated manner in the longitudinal direction. A pair of left and right boom foot shaft support portions 121S is disposed at front end portions of the pair of left and right front plates 121A, respectively. A pair of left and right mast foot shaft support portions 121T is disposed immediately behind the boom foot shaft support portions 121S, respectively. The boom foot shaft support portion 121S supports a boom foot of the boom 16 in a state where the boom foot can be raised and lowered. The mast foot shaft support portions 121T support the mast foot of the mast 20 in a state where the must foot can be raised and lowered. As illustrated in FIG. 5, a radiator 81, an engine 82, and a tank 83 are supported on a rear side portion of the front frame 121. Furthermore, the front frame 121 includes a pair of left and right front connecting portions 123 disposed at respective rear end portions of the pair of left and right front plates 121A spaced apart in the left-right direction. The pair of left and right front connecting portions 123 is provided for connecting the front frame 121 and the rear frame 122 to each other.

The rear frame 122 forms a rear side portion of the slewing frame 120 of the upper slewing body 12. The rear frame 122 is detachably connected to the front frame 121. The rear frame 122 includes: a pair of left and right rear side plates 122A (FIG. 5) that defines both left and right side surfaces of the rear frame 122; a rear lateral plate 122B that defines a rear end portion of the rear frame 122; and a pair of front and rear rope attachment portions 122P (FIG. 3).

Each of the pair of left and right rear side plates 122A has a predetermined height in the vertical direction, and extends in an elongated manner in the longitudinal direction. A length of the rear side plate 122A in the longitudinal direction is shorter than a length of the front plate 121A in the longitudinal direction. The rear lateral plate 122B connects the rear end portions of the pair of left and right rear side plates 122A in the left-right direction. A pair of left and right sheave pivotally support portions 122S is disposed at a center portion of the rear lateral plate 122B. The sheave pivotally support portion 122S rotatably supports each sheave of the sheave block 42 described above. A bottom plate (not illustrated) is disposed between the pair of left and right rear side plates 122A. As illustrated in FIG. 5, the bottom plate supports the boom raising and lowering winch 30 and the like. Furthermore, the rear frame 122 includes a pair of left and right rear connecting portions 124 disposed at respective front end portions of the pair of left and right rear side plates 122A spaced apart in the left-right direction. The pair of left and right rear connecting portions 124 is provided for connecting the front frame 121 and the rear frame 122 to each other.

The crane 10 includes a pair of left and right pin cylinders 71 (FIG. 5). The pair of left and right pin cylinders 71 is a jig capable of switching the connection between the front frame 121 and the rear frame 122 and the release of such connection by moving a pair of left and right connecting pins 72 (see FIG. 10) for connecting the front frame 121 and the rear frame 122 to each other along the left-right direction. Each of the pair of left and right pin cylinders 71 is formed of an expandable and retractable hydraulic cylinder.

The pair of left and right front connecting portions 123 that form a pair have the same structure, and the pair of left and right rear connecting portions 124 that form a pair also have the same structure. Therefore, hereinafter, with reference to FIGS. 4 and 6, the structure of the left front connecting portion 123 and the structure of the left rear connecting portion 124 are described.

The front connecting portion 123 includes a pair of left and right front connecting plates 73 arranged to face each other in the left-right direction, and a positioning pin 731 extending in the left-right direction. The positioning pin 731 is a circular columnar pin that connects upper ends of the pair of left and right front connecting plates 73 to each other in the left-right direction. In the pair of right and left front connecting plates 73, circular front hole portions 73A (front side pin holes) are opened (formed) along the left-right direction at positions below the positioning pin 731 and slightly in front of the positioning pin 731. The front hole portions 73A opened in the respective front connecting plates 73 are disposed at positions that are aligned with each other in the left-right direction. The front hole portions 73A allow the connecting pin 72 that connects the front frame 121 and the rear frame 122 to each other to pass through the front hole portions 73A. A distance between the center of the front hole portion 73A and the center of the positioning pin 731 as viewed from the left-right direction is set to a predetermined reference distance L (FIG. 4).

As illustrated in FIG. 4, a rotation preventing portion 732 is disposed at lower end portions and rear end portions of the pair of left and right front connecting plates 73 respectively. The rotation preventing portions 732 are disposed below and behind the front holes 73A. The rotation preventing portions 732 are provided for preventing the rear frame 122 from rotating downward about the positioning pin 731 beyond a rotation angle at which the front hole portion 73A and the rear hole portion 74A are aligned with each other in the left-right direction.

Furthermore, the front frame 121 includes a front block 121R that connects upper ends of the pair of left and right front connecting plates 73 in the left-right direction. The front block 121R is a plate member having a rectangular shape as viewed in a plan view. The front block 121R is disposed above and in front of the positioning pin 731.

On the other hand, the rear connecting portion 124 has one rear connecting plate 74 having a thickness that allows the rear connecting plate 74 to enter between the pair of left and right front connecting plates 73. The rear connecting plate 74 enters between the pair of left and right front connecting plates 73 and can face the pair of left and right front connecting plates 73 in the left-right direction. With reference to FIG. 4, the rear connecting portion 124 has an arc-shaped inner peripheral surface 74K. The inner peripheral surface 74K defines an opening portion 74H and a pin fitting portion 742. The opening portion 74H allows the positioning pin 731 to pass the opening portion 74H along the vertical direction. The pin fitting portion 742 communicates with the opening portion 74H above the opening portion 74H. The pin fitting portions 742 can fit on an outer peripheral surface of the positioning pin 731 in a state where the rear frame 122 is rotatable about the positioning pin 731.

A circular rear hole portion 74A (rear side pin hole) is opened (formed) in the rear connecting plate 74 along the left-right direction at a position below the pin fitting portion 742 and slightly in front of the pin fitting portion 742. The rear hole portion 74A allows the connecting pin 72 that connects the front frame 121 and the rear frame 122 to each other to pass through the rear hole portion 74A. The rear hole portion 74A has a center that is spaced apart from the center of the pin fitting portion 742 when viewed from the left-right direction by the reference distance L.

The rear connecting portion 124 also has a guide face 741 (inclined surface). The guide face 741 is formed of an end surface of the rear connecting plate 74 on a front side. The guide face 741 is formed such that, in a posture of the rear frame 122 after the pin fitting portion 742 is opened downward, the guide face 741 is inclined frontward and upward toward the rear side so as to be connected to the inner peripheral surface 74K that defines the pin fitting portion 742 below the pin fitting portion 742 and above the rear hole portion 74A. It is possible to bring the guide face 741 into contact with the positioning pin 731 at the time of performing an operation to connect the front frame 121 and the rear frame 122.

As illustrated in FIG. 4, the rear connecting portion 124 includes a pair of left and right positioning blocks 743. The pair of left and right positioning blocks 743 protrudes in the left-right direction from portions of left and right side surfaces of the rear connecting plate 74 below and behind the rear hole portion 74A. The positioning blocks 743 are brought into contact with the rotation preventing portion 732 so as to prevent the further rotation of the rear frame 122 at the position where the front hole portion 73A and the rear hole portion 74A are aligned with each other in the left-right direction.

Specifically, the positioning block 743 has a contact surface 743A (contact portion). The contact surface 743A is a concave portion that is disposed behind and below the rear hole portion 74A, and is formed of a curved surface (circumferential surface) that is concentric with the rear hole portion 74A as viewed in the left-right direction and has an arc shape protruding outward in the radial direction. The contact surface 743A is disposed on a plane that is orthogonal to the left-right direction and passes the rotation preventing portion 732.

With reference to FIG. 4 and FIG. 6, the rotation preventing portion 732 described above is disposed behind and below the front hole portion 73A. The rotation preventing portion 732 is a convex portion that is disposed at a corner portion of the front connecting plate 73 on a lower side, and is formed of a curved surface (circumferential surface) that is concentric with the front hole portion 73A as viewed in the left-right direction and has an arc shape protruding outward in the radial direction. The rotation preventing portion 732 is brought into contact with (is brought into face contact with) the contact surfaces 743A of the positioning blocks 743 along with the rotation of the rear frame 122 in the downward direction about the positioning pin 731, thereby preventing the rotation of the rear frame 122.

Further, the rear connecting portion 124 has a rear block 122R that is disposed on an upper end of the rear connecting plate 74. The rear block 122R is a plate member having an L shape as viewed in a plan view (FIG. 6). The rear block 122R has a distal end portion 122R1 disposed above and in front of the pin fitting portion 742. When the rear connecting portion 124 of the rear frame 122 is connected to the front connecting portion 123 of the front frame 121 (FIG. 6), a distal end portion 122R1 of the rear block 122R is brought into contact with the upper surface portion of the front block 121R. As a result, when an upward force is applied to a rear end portion of the rear frame 122 of the slewing frame 120 during working after the crane 10 is assembled, the force is distributed from the rear block 122R to the front block 121R and hence, the front frame 121 and the rear frame 122 can cooperatively receive the force described above.

In the present embodiment, as illustrated in FIG. 6, each of the left and right rear blocks 122R is formed of a protruding member that protrudes toward the front frame 121. Here, assume a rear block that is formed in a concave shape contrary to the above-mentioned configuration. In this case, the rear block having a concave shape is formed of a pair of plate members that is disposed at an interval in the left-right direction, and one member on a front frame 121 side is received between the pair of plate members. In the manufacture of a large-sized can such as the frame of the crane 10, displacement is likely to be generated in the can in the left-right direction due to the influence of welding distortion and a problem in mounting accuracy. In the case of the concave shape as described above, the left and right plate members are provided to each of the left and right rear connecting portions 124. Accordingly, an operator needs to perform a connecting operation while adjusting the positional relationship between the left and right plate members and the members on the front frame 121 side in each of the left and right rear connecting portions 124. Therefore, it is necessary to enhance the accuracy of respective connecting portions and hence, it is difficult to manufacture the connecting portion, and it is also difficult for an operator to perform a mounting operation. On the other hand, in the present embodiment, in connecting the left and right front connecting portions 123 and the left and right rear connecting portions 124 to each other, an operator can align the left and right front connecting portions 123 and the left and right rear connecting portions 124 to each other in a state where the operator visually recognizes only the right rear block 122R with respect to the connecting portion on the right side and the operator visually recognizes only the left rear block 122R with respect to the connecting portion on the left side. Accordingly, the influence of the manufacturing error is reduced, and the workability at the time of mounting is improved. A case is considered where the front connecting portion and the rear connecting portion are connected to each other without adopting a guide mechanism such as the rear block 122R and the front block 121R according to the present embodiment. In this case, it is necessary to fit a pin of several centimeters to several tens of centimeters sandwiched between two plates into a predetermined groove portion in a state where the rear frame 122 having a weight of several tons to several tens of tons is suspended and hence, the connecting operation is likely to become difficult.

Next, a method of assembling the slewing frame 120 according to the present embodiment will be described. FIG. 7 to FIG. 10 are side views illustrating steps of assembling the slewing frame 120 of the crane 10 according to the present embodiment.

Figure 7:
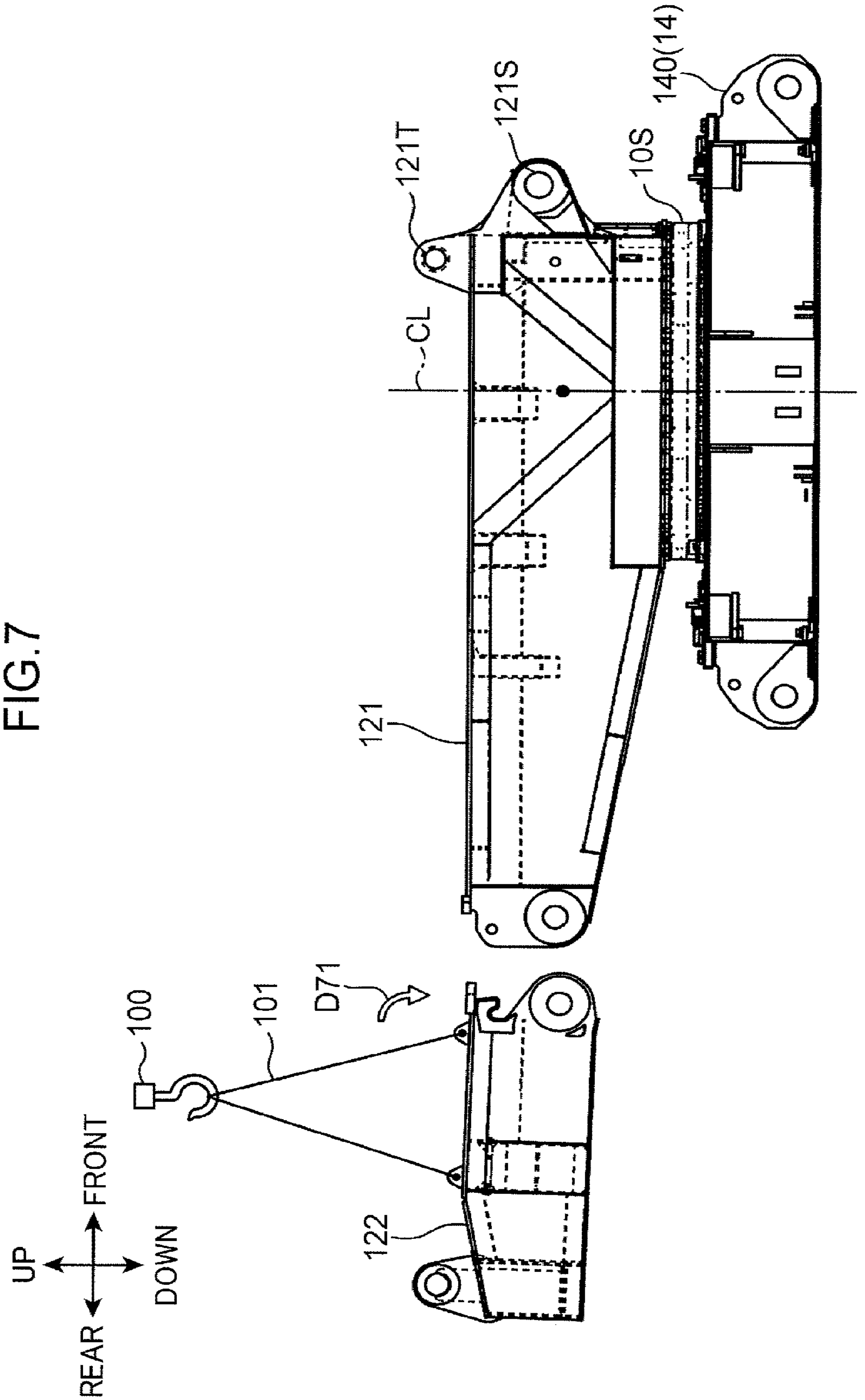
FIG. 7 is a side view illustrating steps of assembling the slewing frame of the work machine according to one embodiment of the present invention.

As illustrated in FIG. 7, in a state where the front frame 121 is turnably supported by the lower travelling body 14 (lower frame 140), a sling 101 hung on a hook 100 of an auxiliary crane (lifting device) (not illustrated) is attached to a pair of front and rear rope attachment portions 122P (FIG. 3) of the rear frame 122, and the rear frame 122 is lifted. At this stage of the operation, by adjusting a length of the sling 101, the rear frame 122 takes a posture where the front side portion of the rear frame 122 is slightly lower than the rear side portion of the rear frame (arrow D71). On the other hand, the front frame 121 has a shape where the front frame 121 extends rearward from the slewing bearing 10S and has a cantilever structure. Accordingly, a rear end portion of the front frame 121 is slightly bent downward (lowered) by its own weight.

Figure 8:
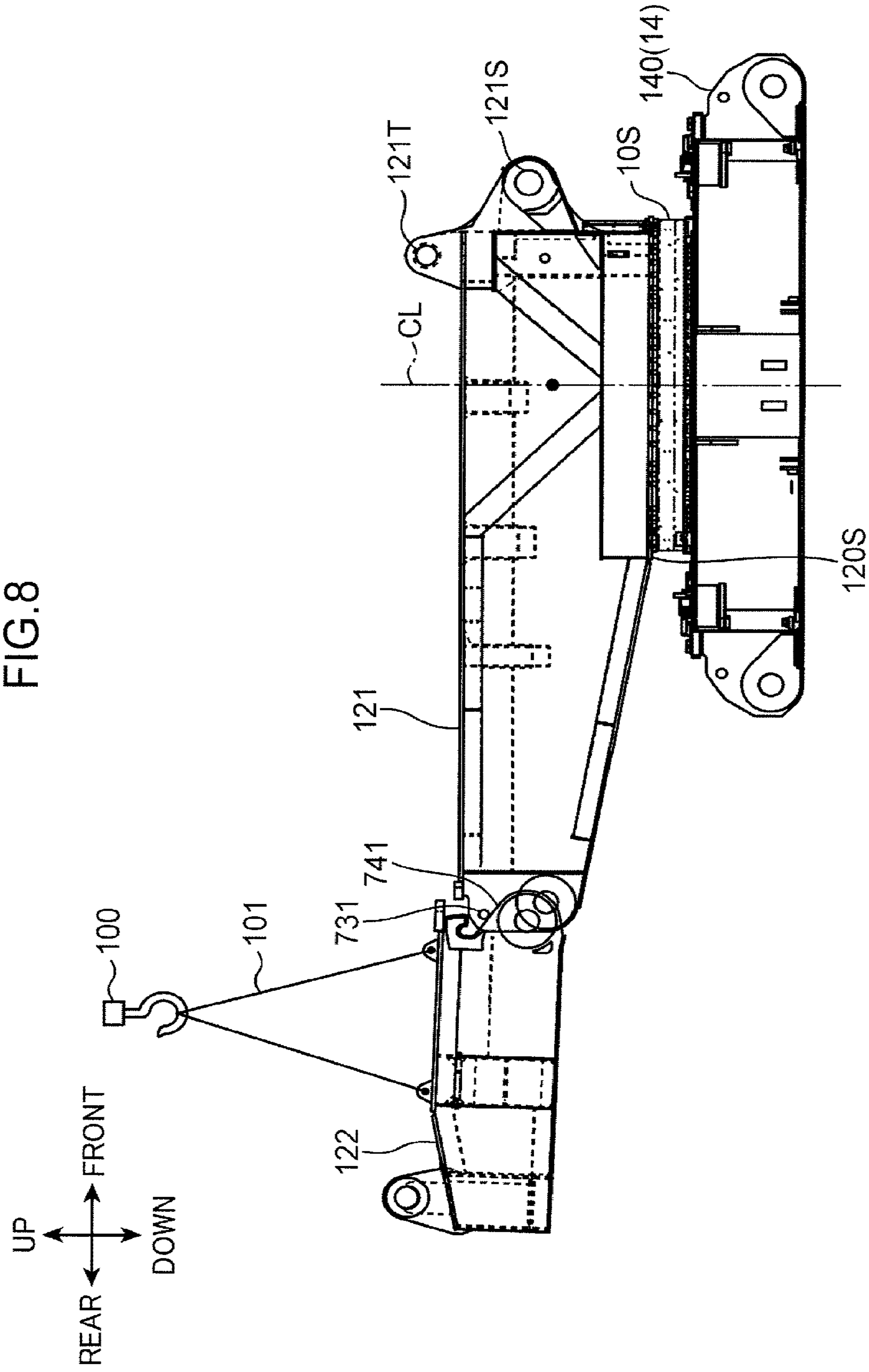
FIG. 8 is a side view illustrating steps of assembling the slewing frame of the work machine according to one embodiment of the present invention.
Figure 9:
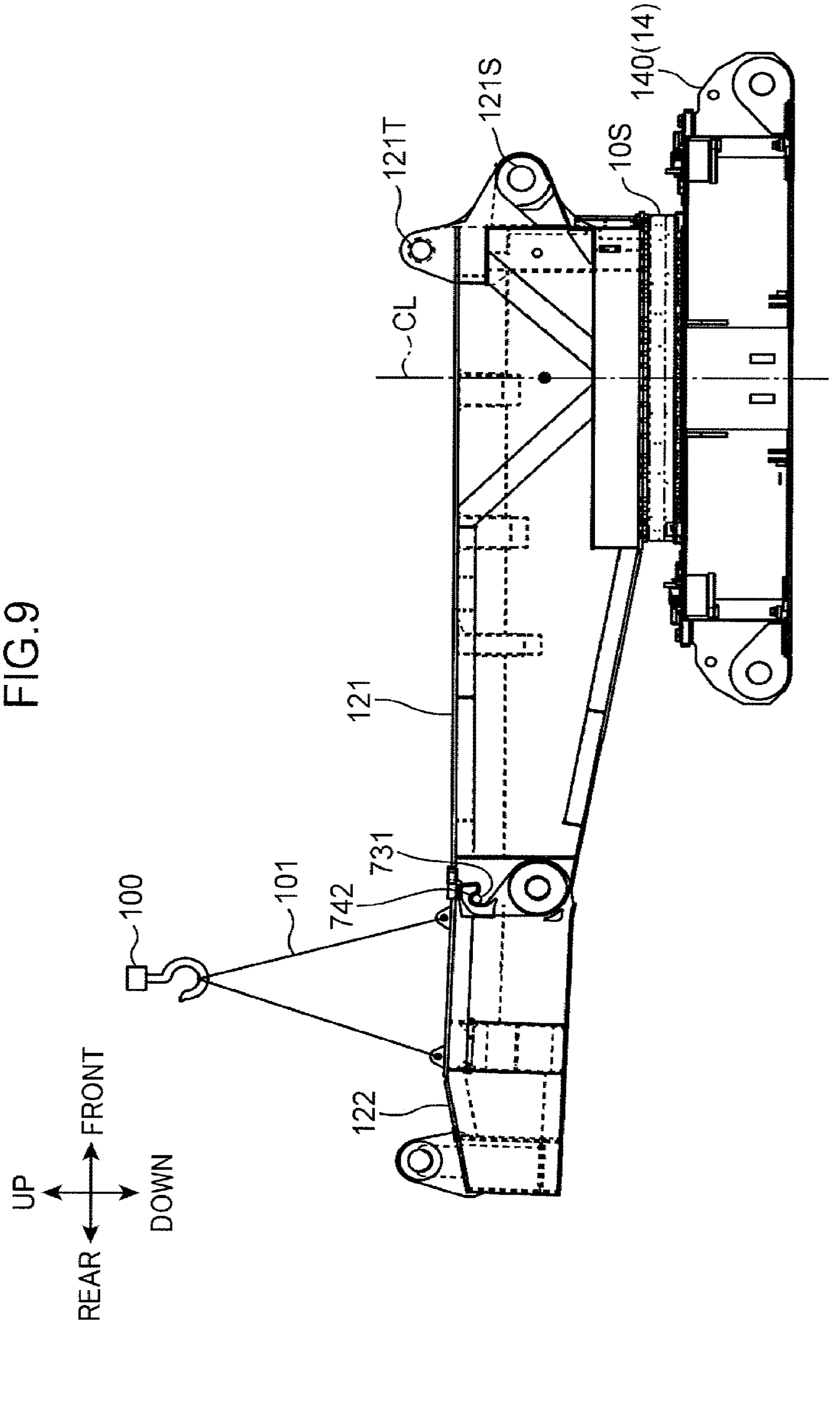
FIG. 9 is a side view illustrating steps of assembling the slewing frame of the work machine according to one embodiment of the present invention.

In this state, the rear frame 122 is moved forward by the auxiliary crane, and is brought close to the front frame 121. To be more specific, the rear frame 122 is moved such that the pair of left and right rear connecting portions 124 of the rear frame 122 approaches the pair of left and right front connecting portions 123 of the front frame 121. Then, as illustrated in FIG. 8, the guide faces 741 of the rear connecting portions 124 are brought into contact with the positioning pins 731 of the front connecting portion 123. Then, when the rear frame 122 is further moved frontward by the auxiliary crane, the positioning pins 731 relatively move upward along the guide faces 741, and the positioning pins 731 fits in the pin fitting portion 742 as illustrated in FIG. 9. At this stage of the operation, on both left and right sides, the distal end portions 122R1 (FIG. 6) of the rear blocks 122R are disposed above the front block 121R. In the state illustrated in FIG. 8, not only the guide faces 741 of the rear connecting portions 124 are simply in contact with the positioning pins 731 of the front connecting portion 123, but also the rear frame 122 is moved so that the positioning pin 731 receives a part of the weight of the rear frame 122. By making the positioning pin 731 to receive a part of the weight of the rear frame 122 in this manner, a force acts on the rear frame 122 in a direction toward the front frame 121 side and downward with respect to the positioning pin 731. Accordingly, when an operator releases a tension of the sling 101 (lowers the hook), the rear frame 122 moves toward the front frame 121 side and downward. As a result, the positioning pin 131 can move along the inclination of the guide face 741 without being separated from the guide face 741. Also in this case, the guide face 741 slides relative to the positioning pin 731 while making the positioning pin 731 receive a part of its weight of the rear frame 122. In this way, the inclination of the guide face 741 functions as an important factor in establishing the connection between the front frame 121 and the rear frame 122.

Figure 10:
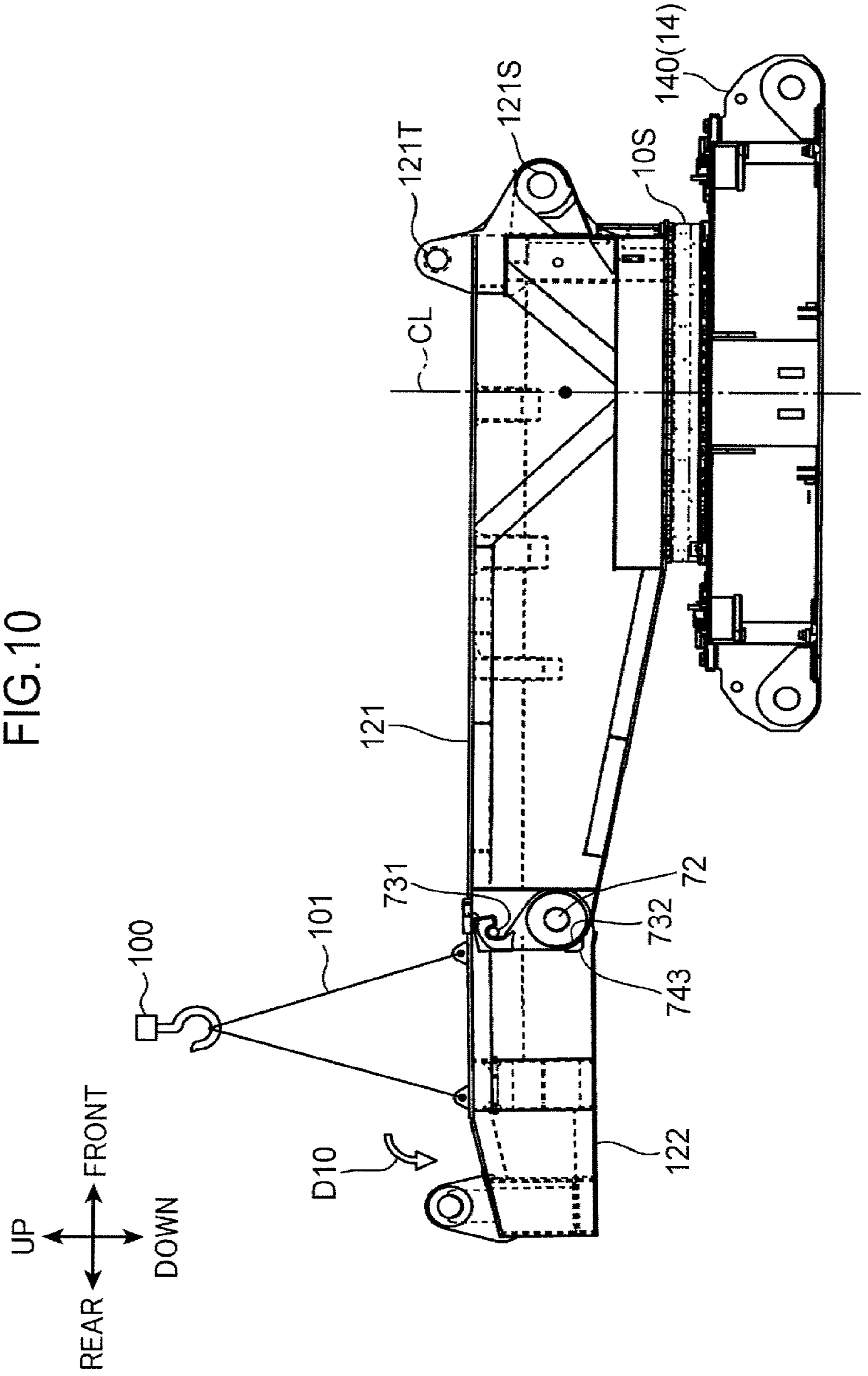
FIG. 10 is a side view illustrating steps of assembling the slewing frame of the work machine according to one embodiment of the present invention.

Next, the operator releases a tension of the sling 101, the rear frame 122 rotates downward about the positioning pin 731 by its own weight so that the rear end side of the rear frame 122 moves downward as indicated by an arrow D10 in FIG. 10. Then, on both left and right sides, the contact surfaces 743A of the positioning blocks 743 of the rear connecting portion 124 are brought into contact with the rotation preventing portions 732 of the front connecting portion 123 so that the rotation of the rear frame 122 is prevented and stopped. As a result, the front hole portion 73A of the front connecting portion 123 and the rear hole portion 74A of the rear connecting portion 124 are aligned along the left-right direction.

Then, by an operation of an operator or in response to a command signal from a control unit (not illustrated) operated by the operator, the pair of left and right pin cylinders 71 in FIG. 5 moves the connecting pins 72 (FIG. 10) outward in the left-right direction. As a result, the connecting pins 72 are sequentially inserted into the front hole portions 73A on an inner side, and the rear hole portions 74A, and front hole portions 73A on an outer side from the inside in the left-right direction, and the front frame 121 and the rear frame 122 are connected to each other on both the left and right sides.

As has been described above, in the slewing frame 120 according to the present embodiment, the slewing frame 120 can be separated into the front frame 121 and the rear frame 122. Accordingly, after the crane 10 is disassembled, it is possible to prevent each member from exceeding a mass limit during transportation. Particularly, when a transport vehicle capable of transporting a structure where the front frame 121 is supported on the lower travelling body 14 is used, it is not necessary to remove the front frame 121 from the lower travelling body 14 (lower frame 140). Accordingly, it is possible to reduce the necessity of removing complicated structures (a swivel unit, hydraulic piping, electrical wiring) around the slewing bearing 10S and hence, the operability of a disassembling and transporting operation of the crane 10 can be enhanced. In addition, even in a case where the front frame 121 is separated from the lower travelling body 14 and is transported, the slewing frame 120 having a longer size in the longitudinal direction than the lower frame 140 of the lower travelling body 14 can be separated. Accordingly, compared with a case where the slewing frame 120 is transported without being separated, a transport vehicle having a smaller restriction on a size dimension can be used.

In the present embodiment, when the pin fitting portion 742 disposed in the rear connecting portion 124 of the rear frame 122 is fitted on the positioning pin 731 disposed on the front connecting portion 123 of the front frame 121 and, thereafter, the rear frame 122 is rotated in the downward direction, at the position where the front hole portion 73A and the rear hole portion 74A are aligned with each other, the contact surface 743A of the positioning block 743 of the rear connecting portion 124 is brought into contact with the rotation preventing portion 732 of the front frame 121. Accordingly, the further rotation of the rear frame 122 can be prevented at the position where the front hole portion 73A and the rear hole portion 74A are aligned with each other. At this stage of the operation, the front frame 121 is supported by the lower travelling body 14 and hence, the rotation of the rear frame 122 can be stably prevented. As a result, the connecting pin 72 can be easily inserted into both pin holes. Accordingly, as compared with a case where the connecting pin 72 is strongly pushed into both pin holes in a state where the front hole portion 73A and the rear hole portion 74A are not aligned with each other, a large labor and a time are not required for the insertion operation of the connecting pin 72 and hence, and the operation of connecting the front frame 121 and the rear frame 122 to each other can be easily performed. In particular, the distance between the front hole portion 73A and the positioning pin 731 and the distance between the rear hole portion 74A and the pin fitting portion 742 are both set to the predetermined reference distance L. Accordingly, both pin holes can be accurately aligned with each other only by aligning the relative positions of the rotation preventing portion 732 and the pin fitting portion 742 (contact surface 742A) in the rotation directions of the front hole portion 73A and the rear hole portion 74A.

In the present embodiment, the positioning pin 731 is guided along the guide face 741 by bringing the guide face 741 disposed in the rear connecting portion 124 of the rear frame 122 into contact with the positioning pin 731. Accordingly, the positioning pin 731 can be easily fitted into the pin fitting portion 742.

Further, in the present embodiment, the contact surfaces 743A of the positioning blocks 743 are arranged on a circumference having the reference distance L as a radius around the pin fitting portion 742 as viewed from the left-right direction behind the rear hole portion 74A. On the other hand, the rotation preventing portion 732 is disposed behind the front hole portion 73A, and is arranged on a circumference having the reference distance L as a radius around the positioning pin 731 as viewed from the left-right direction. In such a configuration, the contact surfaces 743A of the positioning blocks 743 and the rotation preventing portion 732 are disposed on a rotation locus of the rear hole portion 74A during the rotation of the rear frame 122 around the positioning pin 731. Accordingly, compared with the case where the rotation preventing portion 732 and the rear hole portion 74A are disposed at different positions in the radial direction from each other, the rotation preventing portion 732 can stably receive a rotational moment of the rear frame 122 along a tangential direction, and the alignment between the rear hole portion 74A and the front hole portion 73A located in front of the rotation preventing portions 732 can be performed with accurately.

In addition, in the present embodiment, when the rear frame 122 rotates about the positioning pin 731, the contact surface 743A that is formed of a recessed curved surface is brought into face contact with the rotation preventing portions 732 formed of a convex curved surface. Accordingly, it is possible to reduce an impact caused by a contact between the rotation preventing portion 732 and the contact surface 743A. In addition, since the load applied to the contact surface 743A is dispersed by a face contact, rupture and deformation of the contact surface 743A can be suppressed. Furthermore, a frictional force is generated between the contact surface 743A and the rotation preventing portion 732 by face contact between the contact surface 743A and the rotation preventing portion 732 and hence, the rotation preventing portion 732 can further restrict the movement of the contact surface 743A.

In the present embodiment, two front connecting plates 73 are disposed on the front connecting portion 123 of the front frame 121 supported by the lower travelling body 14, while one rear connecting plate 74 is disposed in the rear connecting portion 124 of the rear frame 122 connected to the front frame 121. Then, by allowing the rear connecting plate 74 to enter between two front connecting plates 73, the pin fitting portion 742 fits on the positioning pin 731. As a result, the relative position of the pin fitting portion 742 with respect to the positioning pin 731 in the left-right direction can be easily adjusted. Further, a rotational moment of the rear frame 122 about the positioning pin 731 can be received by two front connecting plates 73 and hence, a connecting operation of connecting the front frame 121 and the rear frame 122 to each other can be stably and reliably performed. At this state of operation, since the rotation preventing portion 732 is formed of the lower end portion of the plate-shaped front connecting plate 73. Accordingly, compared with a case where the rotation preventing portion 732 is formed by attaching other members to the front connecting plate 73, the rotation preventing portion 732 can maintain high rigidity.

In the present embodiment, as illustrated in FIG. 4, the positioning pin 731 is disposed behind the front hole portion 73A, and the pin fitting portion 742 is disposed behind the rear hole portion 74A. With such a configuration, by only inclining the rear frame 122 toward a front side in a forward downward manner after lifting the rear frame 122, it is possible to easily make the pin fitting portion 742 (guide face 741) approach the positioning pin 731.

In the present embodiment, as illustrated in FIG. 4, a lower portion of the rear connecting plate 74 has an arc shape along an outer periphery of the rear hole portion 74A, and the guide face 741 is disposed so as to extend tangentially from the arc shape. An upper end portion of the guide face 741 is connected to the inner peripheral surface 74K that defines the pin fitting portion 742. With such a configuration, an operator who is located around the front frame 121 and the rear frame 122 can easily grasp the position of the rear hole portion 74A by visually recognizing the arc shape that protrudes frontward in the rear connecting portion 124. Therefore, when an operator who operates the auxiliary crane receives a clear message relating to the position of the rear hole portion 74A, the operator can easily make the guide face 741 disposed above the rear hole portion 74A to approach the positioning pin 731 and guides the positioning pin 731 into the pin fitting portion 742 by the guide face 741. An operator of the auxiliary crane located on the side of the front connecting portion 123 and the rear connecting portion 124 may perform the above-mentioned visual recognition operation.

The method of assembling the slewing frame 120 according to the present embodiment includes a preparing step, a lifting step, a positioning pin fitting step, a pin hole aligning step, and a connecting step.

In the preparing step, the front frame 121 that forms the front side portion of the slewing frame 120 is turnably mounted on the lower travelling body 14 (lower frame 140) by way of the slewing bearing 10S. On the other hand, the rear frame 122 that forms the rear side portion of the slewing frame 120 and is detachably connected to the front frame 121 is prepared.

In the lifting step, the rear frame 122 is lifted up by an auxiliary crane (predetermined lifting device) such that the pair of left and right rear connecting portions 124 disposed at the front end portion of the rear frame 122 face the pair of left and right front connecting portions 123 disposed at the rear end portion of the front frame 121 in the longitudinal direction (FIG. 7).

In the positioning pin fitting step, the rear frame 122 is moved in the air by the auxiliary crane, and the pin fitting portions 742 formed in the pair of left and right rear connecting portions 124 respectively are fitted from above on the positioning pins 731 provided to the pair of left and right front connecting portions 123 in a state where the positioning pins 731 extend in the left-right direction (FIG. 8 and FIG. 9).

Furthermore, in the pin hole aligning step, the rear side portion of the rear frame 122 is lowered by the auxiliary crane so as to rotate the rear frame 122 downward around the positioning pin 731. Then, the contact surfaces 743A of the rear frame 122 are brought into contact with the rotation preventing portion 732 formed on the front frame 121, so that the front hole portion 73A disposed below the positioning pin 731 in the front connecting portion 123 and the rear hole portion 74A disposed below the pin fitting portion 742 in the rear connecting portion 124 are aligned with each other in the left-right direction (FIG. 10).

Then, in the connecting step, in each of the left and right front connecting portions 123 and the rear connecting portions 124, the connecting pin 72 is sequentially inserted into the front hole portion 73A and the rear hole portion 74A, and the front frame 121 and the rear frame 122 so as to connect the front frame 121 and the rear frame 122 on the left and right sides.

According to such a method, after the rear frame 122 is lifted by the auxiliary crane, the pin fitting portions 742 of the rear connecting portions 124 of the rear frame 122 are fitted on the positioning pins 731 of the front connecting portions 123 of the front frame 121, and the rear frame 122 is rotated downward, As a result, the contact surfaces 743A and the rotation preventing portion 732 are brought into contact with each other so that the front hole portions 73A and the rear hole portions 74A are aligned with each other. Accordingly, at the time of performing an operation of connecting the rear frame 122 and the front frame 121 to each other, an operation time required for aligning both pin holes with each other can be shortened, and an operation of inserting the connecting pins 72 can be easily performed.

In the positioning pin fitting step of the method of assembling a slewing frame described above, in the rear connecting portion 124 of at least one of the pair of left and right rear connecting portions 124, the positioning pin 731 is brought into contact with the guide face 741 that is inclined frontward and upward toward a rear side such that the guide face 741 is connected to the pin fitting portion 742 below the pin fitting portion 742 and above the rear hole portion 74A, the positioning pin 731 is guided to the pin fitting portion 742 along the guide face 741, and the pin fitting portion 742 is fitted on the positioning pin 731 from above.

According to such a method, the positioning pin 731 can be easily fitted into the pin fitting portion 742 and hence, the operation time required for aligning both pin holes can be further shortened.

The slewing frame 120 of the crane 10 and the method of assembling the slewing frame 120 according to the embodiment of the present invention have been described heretofore. It must be noted that the present invention is not limited to these modes. The present invention can take the following modified embodiments, for example.

(1) The work machine of the present invention is not limited to the crane 10 described above, and may be work machines having other structures such as a crusher or a tower crane. The work machine is not limited to a work machine that can move on a ground. The structure of the crane 10 is not limited to the structure illustrated in FIG. 1, and may be other structures such as a structure without a jib.

(2) In the above-mentioned embodiment, a mode where the front connecting portion 123 is formed of two plate-shaped members and the rear connecting portion 124 is formed of one plate-shaped member has been described. However, the present invention is not limited to such a mode. The present invention is applicable to other modes including a mode where the rear connecting portion 124 is formed of two plate-shaped members, and the front connecting portion 123 is formed of one plate-shaped member, or a mode where both the front connecting portion 123 and the rear connecting portion 124 are each formed of one or a plurality of plate-shaped members.

(3) In the embodiment described above, the mode is described where the positioning blocks 743 (contact portions) are formed on the rear connecting plate 74 of the rear connecting portion 124 in a protruding manner, and the rotation preventing portion 732 is disposed at the lower end of the front connecting plate 73 of the front connecting portion 123. However, the present invention is not limited to such a mode. A member corresponding to the rotation preventing portion may be disposed between the two front connecting plates 73, and a lower end portion of the rear connecting plate 74 may be brought into contact with the member as a contact portion, or other arrangement and structures may be adopted.

The slewing frame of the work machine provided by the present invention is supported by a lower body of the work machine so as to be turnable about a turning center axis that extends in a vertical direction. The slewing frame includes a front frame that forms a front side portion of the slewing frame and is turnably supported by the lower body, and a rear frame that forms a rear side portion of the slewing frame and is detachably connected to the front frame. The front frame has a pair of left and right front connecting portions each of which includes a positioning pin that extends in a left-right direction, the pair of left and right front connecting portions being disposed on a rear end portion of the front frame spaced apart from each other in the left-right direction. In the pair of left and right front connecting portions, a front side pin hole that allows a connecting pin that connects the front frame and the rear frame to each other to pass therethrough is formed in the left-right direction below the positioning pin respectively, a distance between the front side pin hole and the positioning pin being set to a predetermined reference distance as viewed in the left-right direction, the rear frame has a pair of left and right rear connecting portions that are disposed spaced apart from each other in the left-right direction on a front end portion of the rear frame such that the pair of left and right rear connecting portions face the pair of left and right front connecting portions in the left-right direction, the pair of left and right rear connecting portions each include an inner peripheral surface that defines an opening portion that allows the positioning pin to pass through the opening portion in a vertical direction, and a pin fitting portion that communicates with the opening portion above the opening portion and is configured to fit on an outer peripheral surface of the positioning pin such that rear frame is rotatable about the positioning pin, a rear side pin hole that allows insertion of the connecting pin is formed along the left-right direction in a portion of each of the pair of left and right rear connecting portions below the pin fitting portion, a distance between the pin fitting portion and the rear side pin hole is set to the reference distance as viewed in the left-right direction, the pair of left and right front connecting portions of the front frame each have a rotation preventing portion capable of preventing rotation of the rear frame in a downward direction about the positioning pin, and the pair of left and right rear connecting portions of the rear frame each have a contact portion that is disposed on a plane that is orthogonal to the left-right direction and passes the rotation preventing portion, the contact portion being configured to be brought into contact with the rotation preventing portion such that further rotation of the rear frame is prevented at a position where the front side pin hole and the rear side pin hole are aligned with each other in the left-right direction along with the rotation of the rear frame.

With such a configuration, when the pin fitting portion disposed in the rear connecting portion of the rear frame is fitted on the positioning pin disposed on the front connecting portion of the front frame, and the rear frame is rotated in the downward direction, the contact portions of the rear connecting portion are brought into contact with the rotation preventing portion of the front frame, and the further rotation of the rear frame can be prevented by the front frame supported by the lower body at the position where the front pin hole and the rear pin hole are aligned with each other. Accordingly, the connecting pin can be easily inserted into both pin holes. As a result, as compared with a case where the connecting pin is strongly pushed into both pin holes in a state where the front side pin hole and the rear side pin hole are not aligned with each other, a large labor and a larger time are not required for the insertion operation of the connecting pin and hence, the operation of connecting the front frame and the rear frame to each other can be easily performed. In addition, the distance between the front side pin hole and the positioning pin, and the distance between the rear side pin hole and the pin fitting portion are set to the same reference distance. Accordingly, both pins can be aligned with each other with high accuracy only by adjusting the relative positions of the front side pin hole and the rear side pin hole in the rotation direction by the contact between the contact portion and the rotation preventing portion.

In the configuration described above, it is desirable that, each of the pair of left and right rear connecting portions further has an inclined surface that is disposed below the pin fitting portion and above the rear side pin hole, and is capable of being brought into contact with the positioning pin, the inclined surface being frontwardly and upwardly inclined toward a rear side so as to be connected with the inner peripheral surface that defines the pin fitting portion in a posture of the rear frame where the pin fitting portion opens downward.

With such a configuration, the inclined surface that is disposed at the rear connecting portion of the rear frame is brought into contact with the positioning pin of the front frame, and the positioning pin is guided along the inclined surface and hence, the positioning pin can be easily fitted in the pin fitting portion.

In the configuration described above, it is desirable that the contact portion is disposed behind the rear side pin hole and is disposed on a circumference having the reference distance as a radius about the pin fitting portion as viewed in a left-right direction, and the rotation preventing portion is disposed behind the front side pin hole and is disposed on a circumference having the reference distance as a radius about the positioning pin as viewed in a left-right direction.

In such a configuration, the contact portion and the rotation preventing portion are disposed on a rotation locus of the rear side pin hole during the rotation of the rear frame around the positioning pin. Accordingly, compared with the case where the rotation preventing portion and the rear side pin hole are disposed at different positions in the radial direction from each other, the rotation preventing portion can stably receive a rotational moment of the rear frame along a tangential direction and hence, the alignment between the rear side pin hole and the front side pin hole located in front of the rotation preventing portion can be performed with accurately.

In the configuration described above, it is desirable that the contact portion is disposed behind and below the rear side pin hole, the contact portion is a recessed portion having a radially outward protruding convex surface with respect to a center of the rear side pin hole as viewed in a left-right direction, the rotation preventing portion is disposed behind and below the front side pin hole, and is a protruding portion having a radially outwardly protruding curved surface with respect to a center of the front side pin hole as viewed in the left-right direction, the rotation preventing portion being brought into face contact with the contact portion along with the rotation of the rear frame in a lower direction about the positioning pin.

With such a configuration, when the rear frame rotates about the positioning pin, the contact portion is brought into face contact with the rotation preventing portion. Accordingly, an impact generated by the contact between both members can be reduced. Further, a load applied to the contact portion can be dispersed by the face contact and hence, rupture and deformation of the contact portion can be suppressed. Still further, a friction force is generated between the contact portion and the rotation preventing portion and hence, the rotation preventing portion can restrict the movement of the contact portion more effectively.

A method of assembling a slewing frame of a work machine according to another aspect of the present invention is a method of assembling a slewing frame that is supported by a lower body of the work machine so as to be turnable about a turning center axis that extends in a vertical direction. The assembling method includes: a preparing step of preparing a front frame that forms a front side portion of the slewing frame is turnably mounted on the lower body, and a rear frame that forms a rear side portion of the slewing frame and is detachably connected to the front frame; a lifting step of lifting the rear frame by a predetermined lifting device such that a pair of left and right rear connecting portions disposed on a front end portion of the rear frame respectively face a pair of left and right front connecting portions disposed on a rear end portion of the front frame in a longitudinal direction; a positioning pin fitting step of moving the rear frame in air by the lifting device, and fitting pin fitting portions that are formed in the pair of left and right rear connecting portions on positioning pins formed in the pair of left and right front connecting portions such that the positioning pins extend in a left-right direction respectively from above; a pin hole aligning step of rotating the rear frame downwardly about the positioning pins, bringing the contact portion of the rear frame into contact with the rotation preventing portion formed on the front frame, and aligning the front side pin hole formed in the front connecting portion and disposed below the positioning pin and the rear side pin hole formed in the rear connecting portion and disposed below the pin fitting portion with each other in the left-right direction; and a connecting step of inserting, at the front connecting portion and the rear connecting portion on a left side and at the front connecting portion and the rear connecting portion on a right side, the connecting pin into the front side pin hole and the rear side pin hole in order thus connecting the front frame and the rear frame to each other both at the left side and at the right side.

According to such a method, after the rear frame is lifted by the lifting device, the pin fitting portions of the rear connecting portions of the rear frame are fitted on the positioning pins of the front connecting portions of the front frame, the rear frame is rotated using its own weight of the rear frame. As a result, the contact portion and the rotation preventing portion are brought into contact with each other so that the front side pin holes and the rear side pin holes are aligned with each other. Accordingly, at the time of performing an operation of connecting the rear frame and the front frame to each other, an operation time required for aligning both pin holes with each other can be shortened, and an operation of inserting connecting pins can be easily performed.

In the method described above, it is desirable that, the positioning pin fitting step includes, in at least one rear connecting portion out of the pair of left and right rear connecting portions, bringing the inclined surface into contact with the positioning pin, the inclined surface being inclined frontwardly and upwardly toward a rear side so as to be connected to the pin fitting portion below the pin fitting portion and above the rear side pin hole, guiding the positioning pin to the pin fitting portion along the inclined surface, and fitting the pin fitting portion on the positioning pin from above.

With such a method, by bringing the inclined surface that is disposed on the rear connecting portion of the rear frame into contact with the positioning pin, and by guiding the positioning pin along the inclined surface, the positioning pin can be easily fitted in the pin fitting portion. Accordingly, an operation time required for aligning both pin holes can be further shortened.

The present invention provides a slewing frame of a work machine and a method of assembling a slewing frame of a work machine where the slewing frame is separable into at least two front and rear members, and an operation of connecting these two members can be easily performed.

The invention claimed is:

1. A slewing frame that is supported on a lower body of a work machine so as to be turnable about a turning center axis that extends in a vertical direction, the slewing frame comprising:

a front frame that forms a front side portion of the slewing frame, and is turnably supported by the lower body; and a rear frame that forms a rear side portion of the slewing frame, and is detachably connected to the front frame, wherein the front frame has a pair of left and right front connecting portions each of which includes a positioning pin that extends in a left-right direction, the pair of left and right front connecting portions being disposed on a rear end portion of the front frame spaced apart from each other in the left-right direction, in the pair of left and right front connecting portions, a front side pin hole that allows a connecting pin that connects the front frame and the rear frame to each other to pass therethrough is formed in the left-right direction below the positioning pin respectively, a distance between the front side pin hole and the positioning pin being set to a predetermined reference distance as viewed in the left-right direction, the rear frame has a pair of left and right rear connecting portions that are disposed spaced apart from each other in the left-right direction on a front end portion of the rear frame such that the pair of left and right rear connecting portions face the pair of left and right front connecting portions in the left-right direction, the pair of left and right rear connecting portions each include an inner peripheral surface that defines an opening portion that allows the positioning pin to pass through the opening portion in a vertical direction, and a pin fitting portion that communicates with the opening portion above the opening portion and is configured to fit on an outer peripheral surface of the positioning pin such that rear frame is rotatable about the positioning pin, a rear side pin hole that allows insertion of the connecting pin is formed along the left-right direction in a portion of each of the pair of left and right rear connecting portions below the pin fitting portion, a distance between the pin fitting portion and the rear side pin hole is set to the reference distance as viewed in the left-right direction, the pair of left and right front connecting portions of the front frame each have a rotation preventing portion capable of preventing rotation of the rear frame in a downward direction about the positioning pin, and the pair of left and right rear connecting portions of the rear frame each have a contact portion that is disposed on a plane that is orthogonal to the left-right direction and passes the rotation preventing portion, the contact portion being configured to be brought into contact with the rotation preventing portion such that further rotation of the rear frame is prevented at a position where the front side pin hole and the rear side pin hole are aligned with each other in the left-right direction along with the rotation of the rear frame, wherein the positioning pin is disposed behind the front side pin hole such that a straight line passing through a center of the positioning pin and extending in the vertical direction does not intersect the front side pin hole, and the pin fitting portion is disposed behind the rear side pin hole such that a straight line passing through a center of the pin fitting portion and extending in the vertical direction does not intersect the rear side pin hole, as viewed in the left-right direction, each of the pair of left and right rear connecting portions further has an inclined surface that is disposed below the pin fitting portion and above the rear side pin hole, and is brought into contact and guide the positioning pin, the inclined surface being frontwardly and upwardly inclined toward a rear side so as to be connected with the inner peripheral surface that defines the pin fitting portion in a posture of the rear frame where the pin fitting portion opens downward, and in the rear frame, the contact portion is disposed behind and below the rear side pin hole, the inclined surface is disposed above the rear side pin hole, and the rear side pin hole is formed between the contact portion and the inclined surface.

2. The slewing frame of a work machine according to claim 1, wherein the contact portion is disposed behind the rear side pin hole and is disposed on a circumference having the reference distance as a radius about the pin fitting portion as viewed in a left-right direction, and the rotation preventing portion is disposed behind the front side pin hole and is disposed on a circumference having the reference distance as a radius about the positioning pin as viewed in a left-right direction.

3. A slewing frame of a work machine according to claim 1, wherein the contact portion is disposed behind and below the rear side pin hole, the contact portion is a recessed portion having a radially outward protruding convex surface with respect to a center of the rear side pin hole as viewed in a left-right direction, and the rotation preventing portion is disposed behind and below the front side pin hole, and is a protruding portion having a radially outwardly protruding curved surface with respect to a center of the front side pin hole as viewed in the left-right direction, the rotation preventing portion being brought into face contact with the contact portion along with the rotation of the rear frame in a lower direction about the positioning pin.

4. The slewing frame of a work machine according to claim 1, wherein each of the pair of left and right front connecting portions further has a pair of left and right front connecting plates arranged to face each other in the left-right direction and a front block that is disposed above and in front of the positioning pin, and connects upper ends of the pair of left and right front connecting plates in the left-right direction, each of the pair of left and right rear connecting portions further has a rear connecting plate that is capable of entering between the pair of left and right front connecting plates, and a rear block that is disposed on an upper end of the rear connecting plate, the rear block has a distal end portion that is disposed above and in front of the pin fitting portion and is brought into contact with an upper surface portion of the front block when the rear frame is connected to the front frame.

5. A method of assembling a slewing frame that is supported by a lower body of a work machine so as to be turnable about a turning center axis that extends in a vertical direction, the method comprising:

a preparing step of preparing a front frame that forms a front side portion of the slewing frame is turnably mounted on the lower body, and a rear frame that forms a rear side portion of the slewing frame and is detachably connected to the front frame;

a lifting step of lifting the rear frame by a predetermined lifting device such that a pair of left and right rear connecting portions disposed on a front end portion of the rear frame respectively face a pair of left and right front connecting portions disposed on a rear end portion of the front frame in a longitudinal direction;

a positioning pin fitting step of moving the rear frame in air by the lifting device, and fitting pin fitting portions that are formed in the pair of left and right rear connecting portions on positioning pins formed in the pair of left and right front connecting portions such that the positioning pins extend in a left-right direction respectively from above;

a pin hole aligning step of rotating the rear frame downwardly about the positioning pins, bringing a contact portion of the rear frame into contact with a rotation preventing portion formed on the front frame, and aligning the front side pin hole formed in the front connecting portion and disposed below the positioning pin and the rear side pin hole formed in the rear connecting portion and disposed below the pin fitting portion with each other in the left-right direction; and a connecting step of inserting, at the front connecting portion and the rear connecting portion on a left side and at the front connecting portion and the rear connecting portion on a right side, the connecting pin into the front side pin hole and the rear side pin hole in order thus connecting the front frame and the rear frame to each other both at the left side and at the right side, wherein the positioning pin fitting step includes, in at least one rear connecting portion out of the pair of left and right rear connecting portions, bringing an inclined surface into contact with the positioning pin, the inclined surface being inclined frontwardly and upwardly toward a rear side so as to be connected to the pin fitting portion below the pin fitting portion and above the rear side pin hole, guiding the positioning pin to the pin fitting portion along the inclined surface, and fitting the pin fitting portion on the positioning pin from above, the preparing step includes:

preparing the front frame such that the positioning pin is disposed behind the front side pin hole in a manner that a straight line passing through a center of the positioning pin and extending in the vertical direction does not intersect the front side pin hole, as viewed in the left-right direction; and preparing the rear frame such that the pin fitting portion is disposed behind the rear side pin hole in a manner that a straight line passing through a center of the pin fitting portion and extending in the vertical direction does not intersect the rear side pin hole, as viewed in the left-right direction, and the contact portion is disposed behind and below the rear side pin hole, the inclined surface is disposed above the rear side pin hole, and the rear side pin hole is formed between the contact portion and the inclined surface.

6. The method of assembling a slewing frame of a work machine according to claim 5, wherein, the preparing step includes preparing the front frame such that each of the pair of left and right front connecting portions further has a pair of left and right front connecting plates arranged to face each other in the left-right direction and a front block that is disposed above and in front of the positioning pin and connects upper ends of the pair of left and right front connecting plates in the left-right direction, and preparing the rear frame such that each of the pair of left and right rear connecting portions further has a rear connecting plate that is capable of entering between the pair of left and right front connecting plates, and a rear block that is disposed on an upper end of the rear connecting plate; and the connecting step includes entering the rear connecting plate between the pair of left and right front connecting plates and bringing a distal end portion of the rear block into contact with an upper surface portion of the front block.

* * * * *